(12) United States Patent
Smith

(10) Patent No.: US 6,196,687 B1
(45) Date of Patent: Mar. 6, 2001

(54) MEASURING CONVERGENCE ALIGNMENT OF A PROJECTION SYSTEM

(75) Inventor: Ronald D. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/293,189

(22) Filed: Apr. 16, 1999

(51) Int. Cl.[7] ................................................. G03B 21/00
(52) U.S. Cl. .............................. 353/31; 353/34; 349/5; 348/745; 348/787
(58) Field of Search ................................ 353/31, 122, 34, 353/79, 74, 119; 348/766, 786, 787, 190, 191, 745, 747, 806, 809; 349/5, 8

(56) References Cited

U.S. PATENT DOCUMENTS

| 4,485,394 | 11/1984 | Ghaem-Maghami et al. ......... 358/10 |
| 5,258,830 | 11/1993 | Schmidt et al. ........................ 358/60 |
| 5,345,262 | 9/1994 | Yee et al. .............................. 348/177 |
| 5,384,453 | * 1/1995 | Peng ..................................... 235/467 |
| 5,422,693 | * 6/1995 | Vogeley et al. ...................... 353/122 |
| 5,923,366 | * 7/1999 | Kawashima et al. ................ 348/190 |

FOREIGN PATENT DOCUMENTS 0 703 714 A2   3/1996   (EP).

* cited by examiner

Primary Examiner—Safet Metjahic
Assistant Examiner—E P LeRoux
(74) Attorney, Agent, or Firm—Trop, Pruner & Hu, P.C.

(57) ABSTRACT

A system for measuring the convergence alignment may include an optical system arranged to preferentially image and magnify the regions of a display screen outside the area normally viewed by users. That area may include convergence targets which may be associated with each corner of the display. That information may be provided as a unified image to an imaging sensor which may thereafter be utilized to analyze the information and if desired, make appropriate corrections.

27 Claims, 8 Drawing Sheets

MEASURING CONVERGENCE ALIGNMENT OF A PROJECTION SYSTEM

BACKGROUND

The invention relates to aligning images of a projection system, such as a liquid crystal display (LCD) projection system, for example.

Referring to FIG. 1, a reflective liquid crystal display (LCD) projection system 5 typically includes an LCD display panel (LCD display panels 22, 24 and 26, as examples) for each primary color that is projected onto a screen 10. In this manner, for a red-green-blue (RGB) color space, the projection system 5 may include an LCD display panel 22 that is associated with the red color band, an LCD display panel 24 that is associated with the green color band and an LCD display panel 26 that is associated with the blue color band. Each of the LCD panels 22, 24 and 26 modulates light from a light source 30 to form red, green and blue images, respectively, that add together to form a composite color image on the screen 10. To accomplish this, each LCD display panel 22, 24 or 26 receives electrical signals that indicate the corresponding modulated beam image to be formed.

More particularly, the projection system 5 may include a beam splitter 14 that directs a substantially collimated white beam 11 of light (provided by the light source 30) to optics that separate the white beam 11 into red 13, blue 17 and green 21 beams. In this manner, the white beam 11 may be directed to a red dichroic mirror 18 that reflects the red beam 13 toward the LCD panel 22 that, in turn, modulates the red beam 13. The blue beam 17 passes through the red dichroic mirror 18 to a blue dichroic mirror 20 that reflects the blue beam 17 toward the LCD display panel 26 for modulation. The green beam 21 passes through the red 18 and blue 20 dichroic mirrors for modulation by the LCD display panel 24.

For reflective LCD display panels, each LCD display panel 22, 26 and 24 modulates the incident beams, and reflects the modulated beams 15, 19 and 23, respectively, so that the modulated beams 15, 19 and 23 return along the paths described above to the beam splitter 14. The beam splitter 14, in turn, directs the modulated beams 15, 19 and 23 through projection optics, such as a lens 12, to form modulated beam images that ideally overlap and combine to form the composite image on the screen 10.

However, for purposes of forming a correct composite image on the screen 10, the corresponding pixels of the modulated beam images may need to align with each other. For example, a pixel of the composite image at location (0,0) may be formed from the superposition of a pixel at location (0,0) of the modulated red beam image, a pixel at location (0,0) of the modulated green beam image and a pixel at location (0,0) of the modulated blue beam image. Without this alignment, the color of the pixel at location (0,0) may be incorrect, or the color may vary across the pixel.

At the time of manufacture of the system 5, the LCD display panels 22, 24 and 26 typically are mounted with sufficient accuracy to align the pixels of the modulated beam images. One way to accomplish this is to approximate the correct position of the LCD display panels 22, 24 and 26 and thereafter use the LCD display panels 22, 24 and 26 to attempt to form a white rectangular composite image onto the screen 10. If the LCD panels 22, 24 and 26 are not properly aligned, then red 42, green 44 and/or blue 46 color borders may be detected around the perimeter of a white image 40 that is formed on the screen 10, as depicted in FIG. 2. However, when the LCD panels 22, 24 and 26 are properly aligned, the color borders 42, 44 and 46 do not appear, and an enlarged white image 40 appears on the screen 10, as depicted in FIG. 3.

Unfortunately, conventional techniques that are used to align the LCD display panels 22, 24 and 26 may consume a considerable amount of time in the manufacture of the projection system 5. Furthermore, such factors as aging and thermal drift may cause the LCD displays panels 22, 24 and 26 to fall out of alignment during the lifetime of the projection system 5.

Thus, there is a continuing need to address one or more of the problems stated above.

SUMMARY

In one embodiment, a system for measuring convergence alignment of a projected image of a projection display includes an optical system adapted to create separate images of at least two spaced locations on the projected image. An image sensor is arranged to capture the separate images.

DETAILED DESCRIPTION

Figure 1:
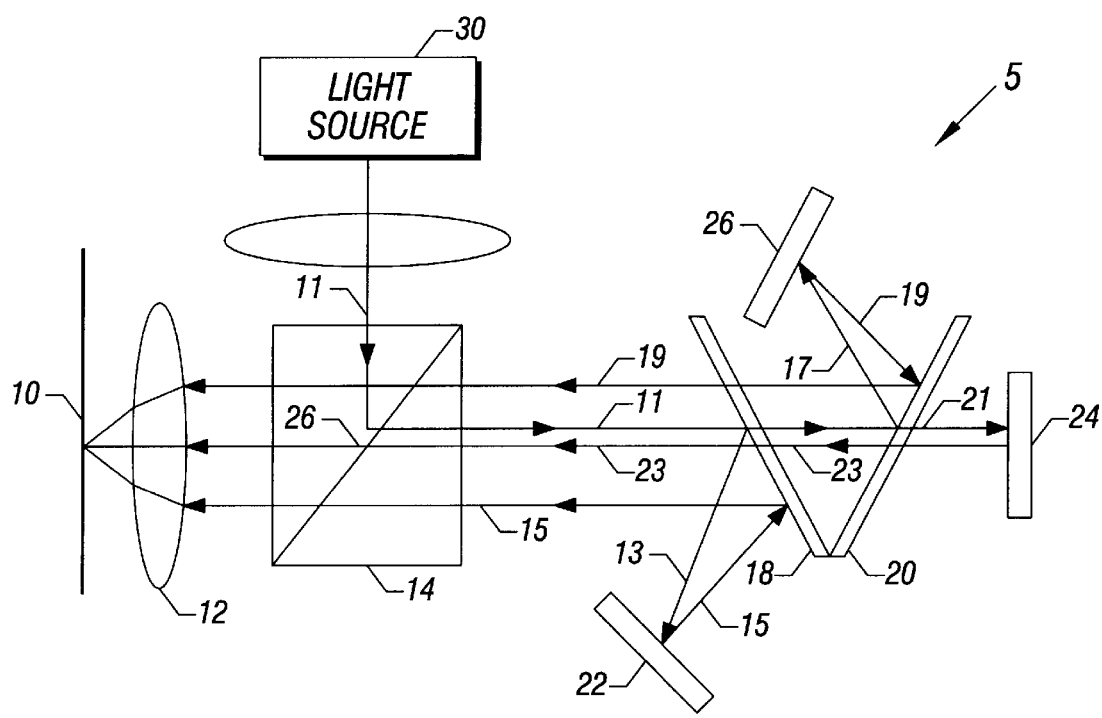
FIG. 1 is a schematic diagram of an LCD projection system of the prior art.
Figure 2:
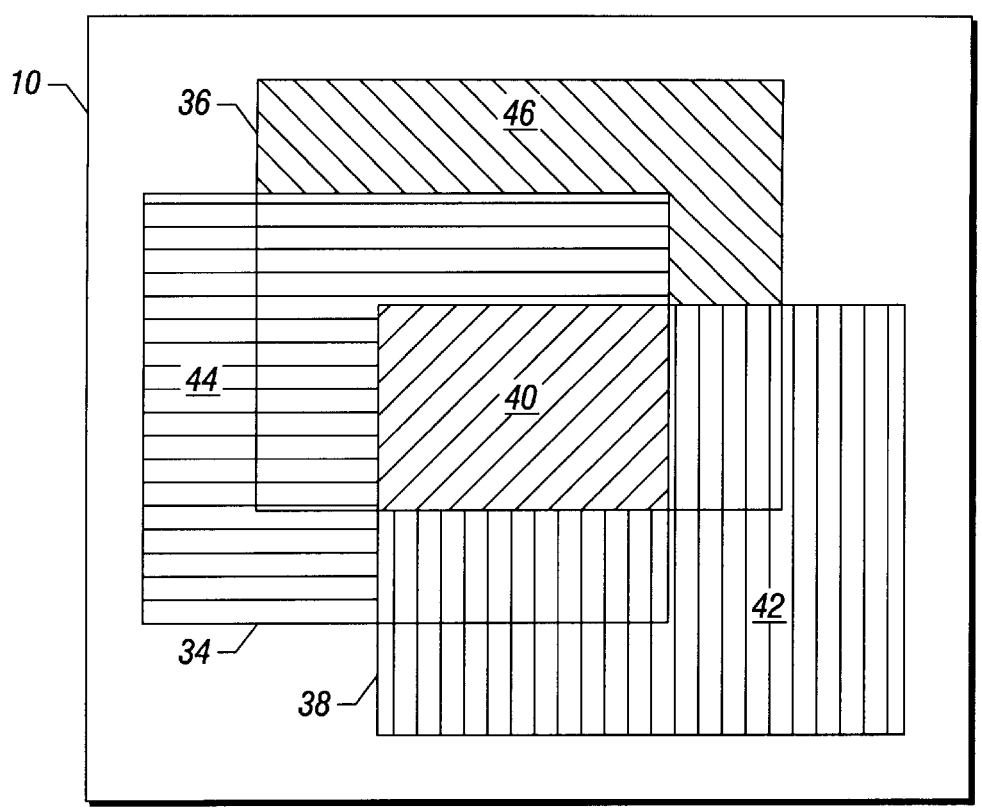
FIG. 2 is an illustration of images formed by LCD display panels of the system of FIG. 1 when the display panels are not aligned.
Figure 3:
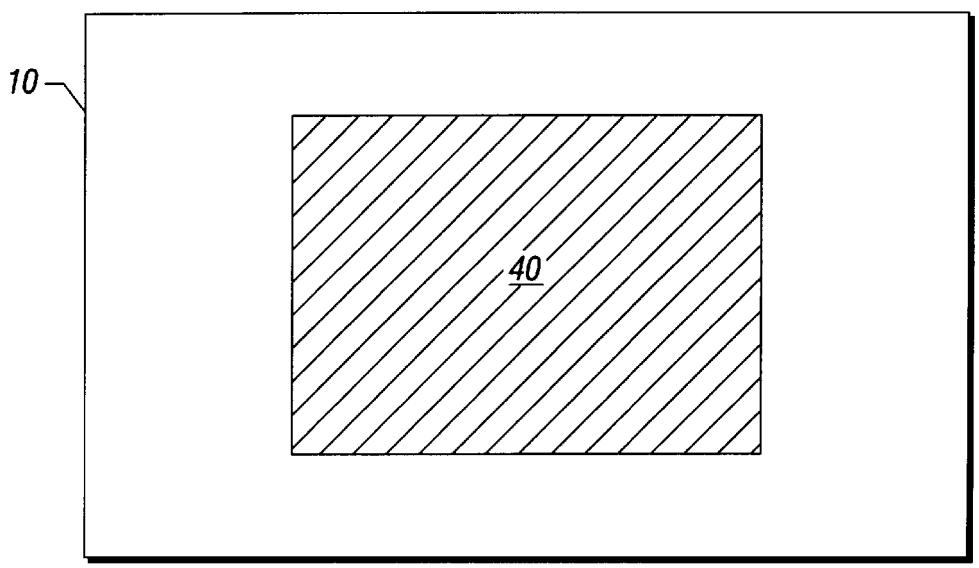
FIG. 3 is an illustration of an image formed by LCD display panels of the system of FIG. 1 when the display panels are aligned.
Figure 4:
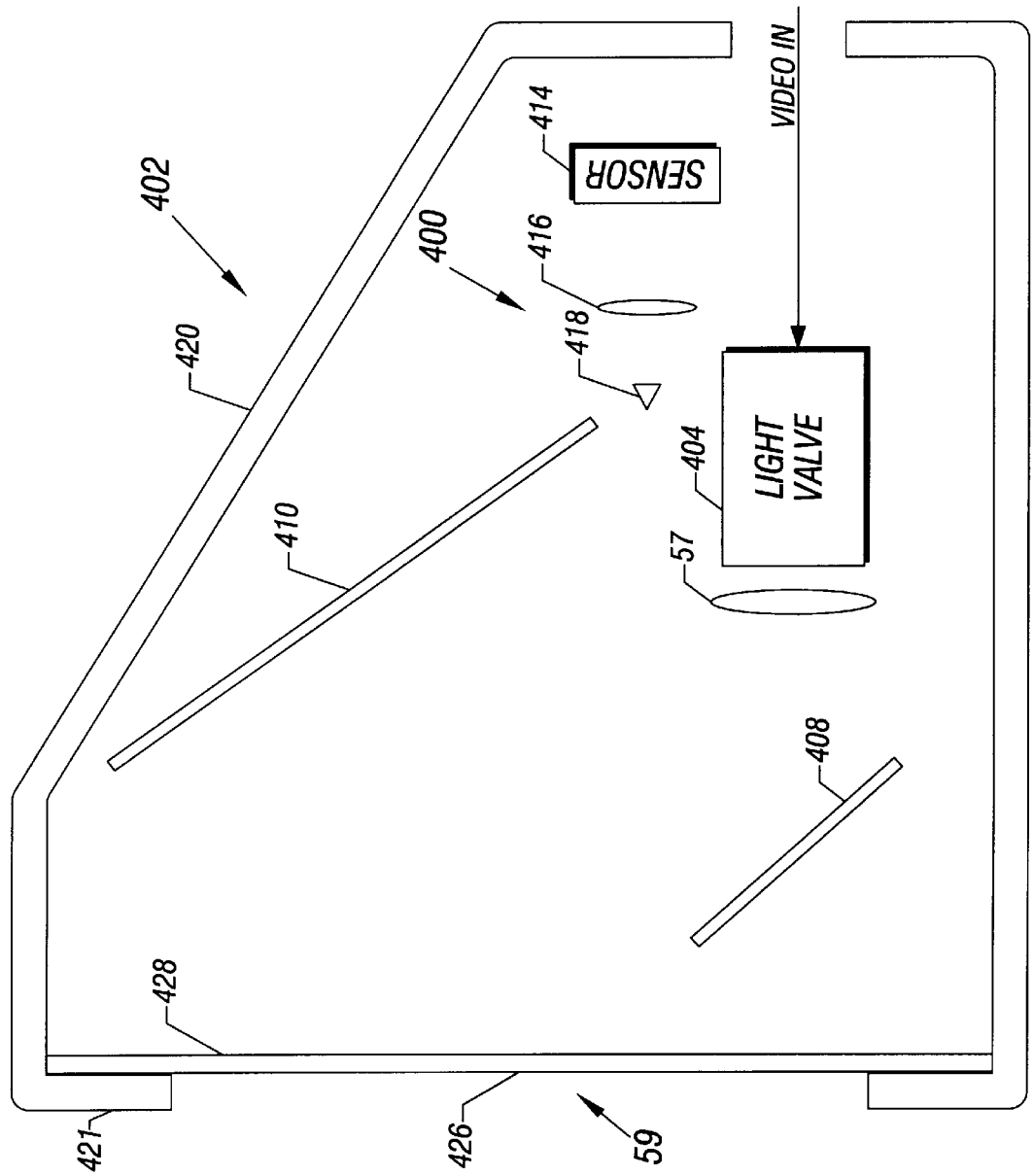
FIG. 4 is a schematic depiction of a projection system in accordance with one embodiment of the present invention.

Referring to FIG. 4, an image capturing system 400 is incorporated into a projection display 402. The projection display 402 may be of any form. For example, in one embodiment of the present invention, a light valve 404 may receive input video and project that video through a projection lens 57 onto a folding mirror 408 which reflects the image onto a projection mirror 410 and then onto a screen 59. The images projected onto the screen 59 are viewable from outside the housing 420.

The image capturing system 400 includes a digital sensor 414 which may be a complementary metal oxide semiconductor (CMOS) sensor or another digital sensor such as a charge coupled device (CCD) sensor. The image capturing system also includes a lens 416 and optical system 418. The optical system 418 is adapted to selectively capture an image of the portions of the screen 59 proximate to convergence targets positioned outside of the viewable portion of the display.

Figure 5:
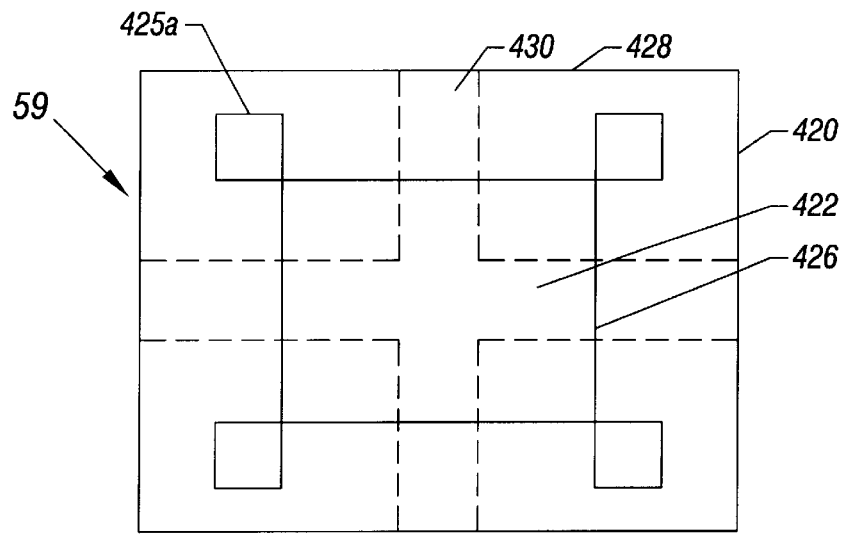
FIG. 5 is a front elevational view of the screen shown in FIG. 4.

In one embodiment, the screen 59 may be mounted into the housing 420 so that all the user sees is the housing and a portion of the projection screen 59. Viewable only from inside the housing 420, are convergence targets 425, as shown in FIG. 5. The convergence targets 425 may be of a variety of conventional types. They may be situated outside the viewable display portion 426 in the peripheral region 428. The peripheral region 428 is hidden from a user outside the housing 420 due to the intervention of a portion 421 of the housing 420 which covers the outside surface of the region 428, as shown in FIG. 4.

Each target 425 may provide information about the convergence of the displayed color planes. In a sense then, the convergence targets are test patterns for measuring convergence alignment of the display. They may have images on them or they may simply receive samples of the light from the display.

Figure 6:
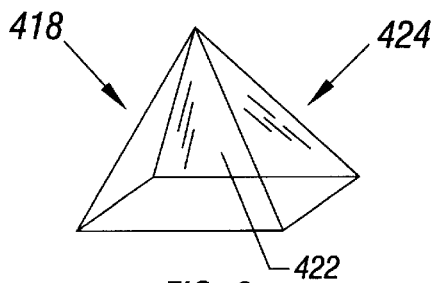
FIG. 6 is a perspective view of one embodiment of the prism that may be used in the embodiment shown in FIG. 4.

Referring to FIG. 6, the optical system 418 may include a pyramidal prism 424 including four sides 422. Each side or facet 422 is optically aligned with one of the convergence targets 425 in one embodiment of the invention. Thus, in one embodiment, each facet preferentially captures an image of each corner of the display screen 59 including a convergence target 425, and further including adjacent portions of the peripheral region 428 outside of the viewable portion 426.

Figure 7:
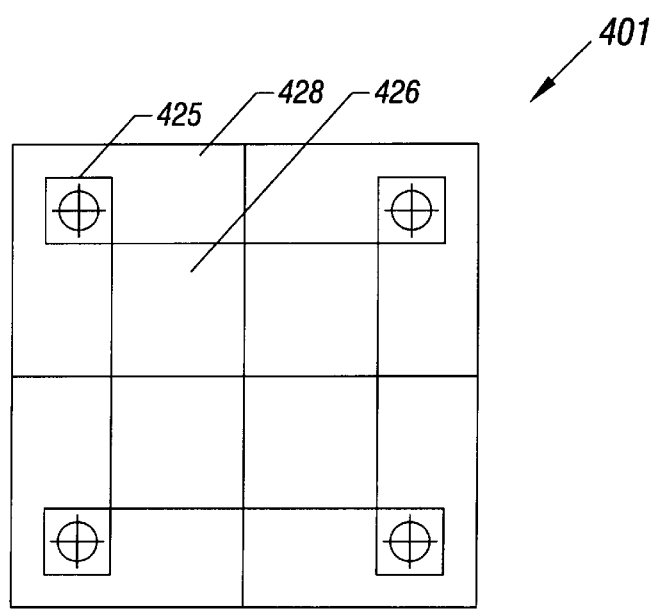
FIG. 7 is a view corresponding to the image received by the sensor in the embodiment shown in FIG. 4.

Referring to FIG. 7, an example of an image 401 captured by the image capturing system 400 is illustrated. It includes magnified versions 425a of the convergence targets 425 together with proximate quadrants 426 of the display actually viewed by the user. Since it captures the convergence targets 425, the system 400 also captures portions of the region 428 not viewable by the user which include the target 425. In this way, magnified images of the corner regions may be obtained so that the resolution of the imaging sensor 414 is conceptually moved to the corners. A plus-shaped region 430, shown in FIG. 5, may be excluded from the image 401 to improve the resolution of the convergence targets 425.

The imaging system 400 need not correct for chromatic aberration since all that is desired is to determine the degree and direction of chromatic aberration. The lens 416 may provide sufficient magnification so that more than one sensor pixel is associated with each projected pixel of interest. This improves the resolution of the location of each of the three color planes. As a result, it is easier to determine if there is misalignment.

The sensor 414 may include a color filter array (CFA) to separate the colors. The convergence pattern contribution of the red color stimulates the red CFA color pixels and so on. Post processing of the color data provides information for correction of chromatic aberration and provides the actual displacement of each color about the beam or about a reference color.

Once the displacement has been measured, electromechanical, optical, electronic or any other means may be used to provide convergence alignment. Imaging each of the four corners allows a highly accurate determination of offset, tilt and magnification errors.

In embodiments which are contained essentially in a housing as illustrated, focus adjustments for the optics system 400 may be unnecessary since the distances are all fixed. Thus, the system continues to monitor the convergence targets during an initial set-up phase and thereafter to accurately sense any convergence errors which may arise, in one embodiment of the invention. In other embodiments focus adjustments may be applied as needed.

While a variety of different techniques may be utilized to correct any convergence errors that are detected by the system 400, an example of one technique is described hereinafter. This does not in any way suggest or imply that the present invention is in any way limited to any specific technique for correcting convergence errors.

Figure 8:
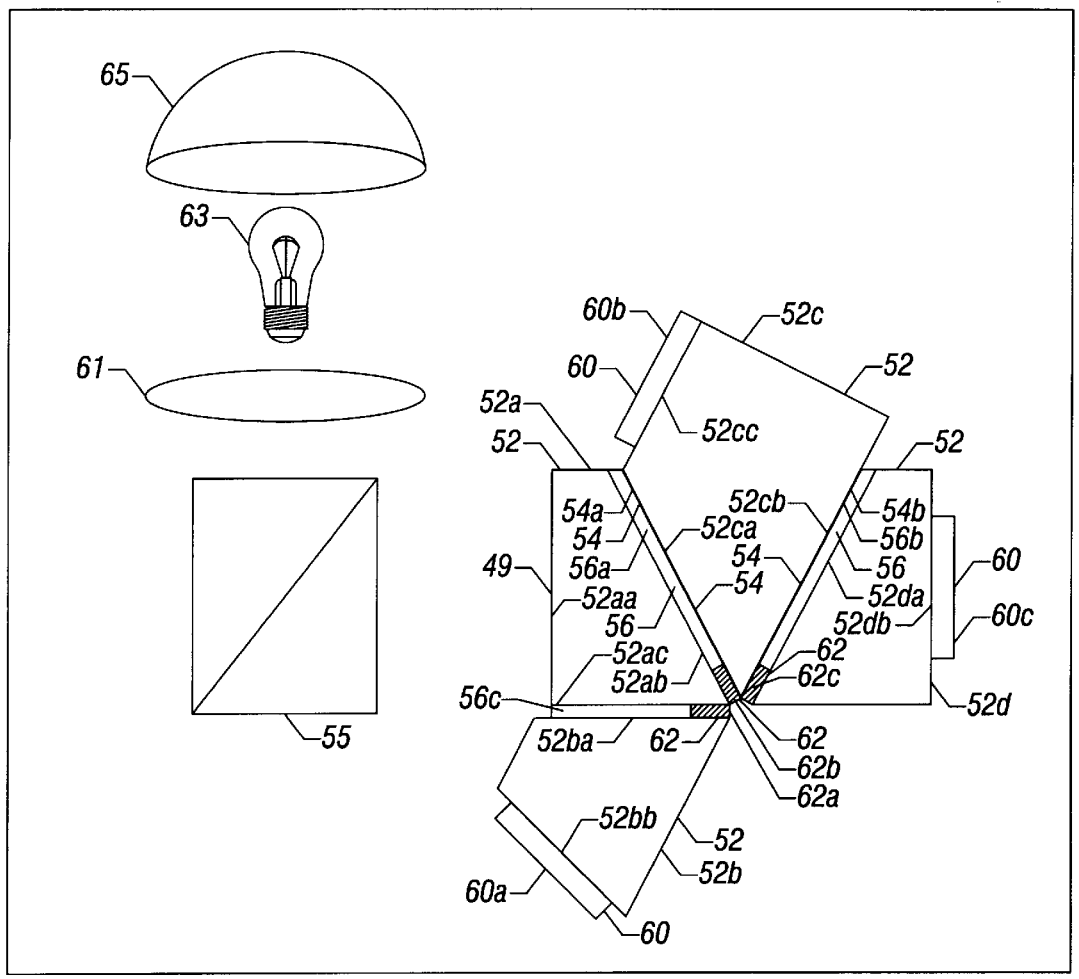
FIG. 8 is a schematic diagram of a light valve according to an embodiment of the invention.
Figure 9:
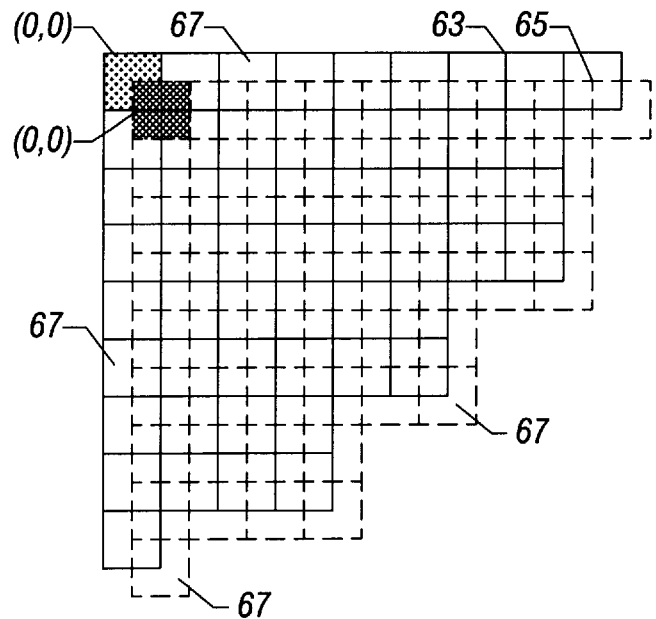
FIGS. 9, 10 and 11 are illustrations of alignment scenarios between two modulated beam images that are formed by display panels of the projection system of FIG. 8.

More particularly, FIG. 9 illustrates two modulated beam images 63 and 65, each of which is formed by a different display panel 60 of the light valve 404 modulating an incident beam of light of a particular color band. Each pixel 67 of the beam image 63 is located approximately ½ pixel from the corresponding pixel 67 of the beam image 65, i.e., the beam images 63 and 65 are "½ pixel" out of alignment. Thus, the pixel 67 at location (0,0) of the image 65 is approximately ½ pixel away from the pixel 67 at location (0,0) of the image 63. To cause the two beam images 63 and 65 to converge, actuators 62 (see FIG. 8) may be used to reposition the display panel 60 that generated the beam image 63, reposition the display panel 60 that generated the beam image 65 or reposition both of the display panels 60. As illustrated, the rows (and columns) of pixels 67 of the beam image 63 are parallel to the rows (and columns) of pixels of the beam image 65. Thus, translational movement (and not rotational movement, described below) of one or more display panel(s) 60 may be used to cause the beam images 63 and 65 to converge.

Figure 10:
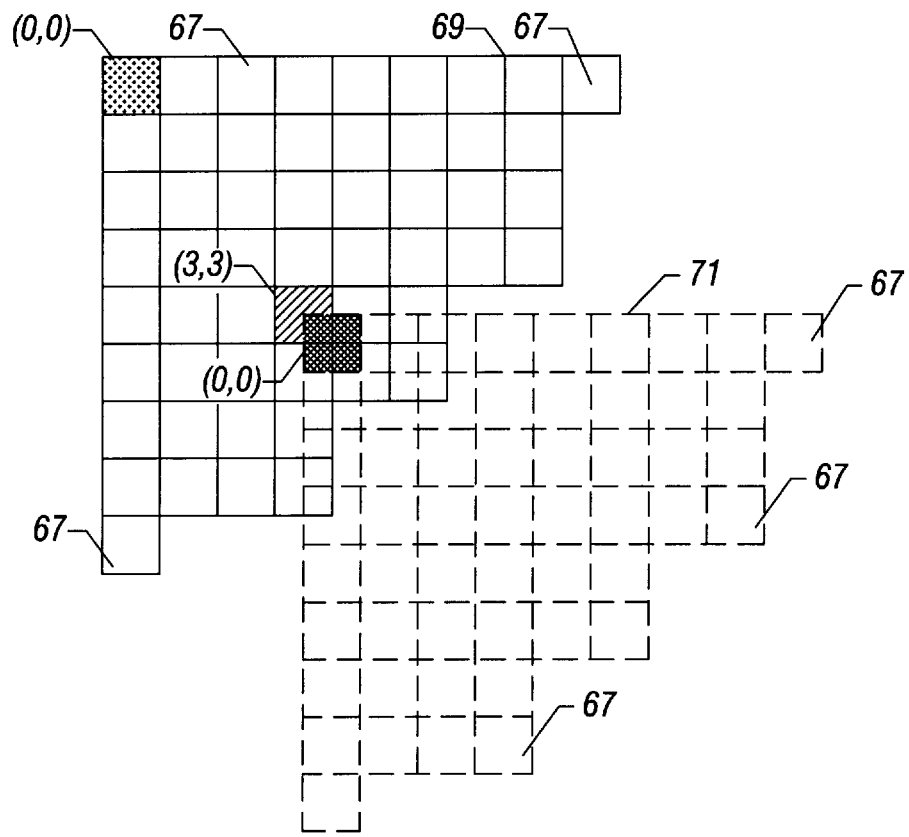

In some embodiments, the actuators 62 may be used to perform a maximum alignment of up to approximately one pixel, hereinafter called a fine, or local, adjustment, for purposes repositioning display panel(s) to align the boundaries of pixels. However, before calibration, some modulated beam images may be located further apart, as illustrated in FIG. 10. For example, a pixel 67 at location (0,0) of a modulated beam image 71 may be located several pixels away from a pixel at location (0,0) of a modified beam image 69. For this scenario, in some embodiments, the actuators 62 may be used to locally align the beam images 69 and 71 so that the pixels (regardless of their locations) of the beam images 69 and 71 are locally (but not globally) aligned. For example, due to this local alignment, the pixel at location (3,3) of the beam image 69 may be aligned with the pixel at location (0,0) of the beam image 71, i.e., the boundaries of the pixels are aligned.

In some embodiments, coarse, or global, alignment may be performing by remapping pixels of one or more display panels 60, as described below. This remapping, in turn, may align the pixel at location (0,0) of the beam image 71, shown in FIG. 10, by remapping pixel locations of the display panel that forms the beam image 69, for example. For this to occur, extra pixels (also called "pixel cells" or "pixel elements") of the display 60 that forms the beam image 69 may be used.

Figure 12:
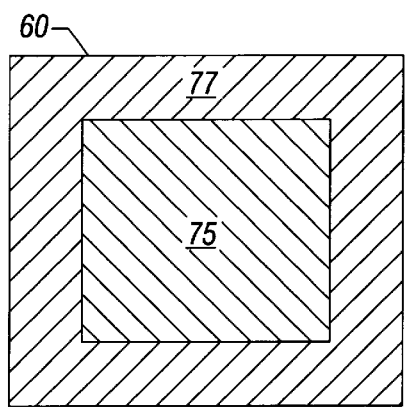
FIG. 12 is an illustration of a display panel according to an embodiment of the invention.

As an example, for a desired resolution of 1024 horizontal pixels by 768 vertical pixels (i.e., for a 1024×768 display), the display panel 60 may have 1034 horizontal pixels by 778 vertical pixels, i.e., ten extra pixels in both the vertical and horizontal directions. In this manner, a block 75 (FIG. 12) of the pixels may be active and thus, may be used to form the modulated beam image. The remaining pixels 77 may be inactive, or permanently turned off, due to the application of a mapping function to correct global misalignment. To accomplish this, the mapping of the pixels on the display panel 60 are adjusted accordingly to shift the block 75 of active pixels horizontally, vertically or in both directions.

Thus, in FIG. 10, the pixels of the display 60 that generated the beam image 69 may be remapped so that the pixels of the display that form pixels 67 of the beam image 69 that do not globally converge with the beam image 71 are turned off. Therefore, the pixels of the display panel 60 that form the beam image 69 may be remapped to effectively shift the block of active pixels of the display panel 60 down by four rows and to the right by three columns to globally align the beam images 69 and 71.

Referring back to FIG. 8, in some embodiments, the light valve 404 may include prisms 52 (prisms 52a, 52b, 52c and 52d, as examples) that direct an incoming beam of white light (formed from red, green and blue beams) from a light source 63 to the display panels 60, as described below. In particular, the prism 52a receives the incoming white beam of light at a prism face 52aa that is normal to the incoming light and directs the beam to a prism face 52ab that is inclined toward the face 52aa. The reflective face of a red dichroic mirror 54a may be mounted to the prism face 52ab or to the prism face 52ca by a transparent elastomeric adhesive layer 56a that aids in positioning the display panels 60b and 60c, as further described below.

The red dichroic mirror 54a separates the red beam from the incoming white beam by reflecting the red beam so that the red beam exits another prism face 52ac of the prism 52a and enters a prism face 52ba of the prism 52b. The prism faces 52ac and 52ba may be mounted together via a transparent elastomeric adhesive layer 56c that aids in positioning the display panel 60a. The prism 52b, in turn, directs the red beam to the incident face of the display panel 60a that is mounted to another prism face 52bb of the prism 52b that is inclined toward the prism face 52ba. The display panel 60a modulates the incident red beam, and the modulated red beam follows a similar path to the path followed by the incident red beam. However, instead of being directed toward the light source 63, a beam splitter 55 directs the modulated red beam through projection optics 57 (a lens, for example) that forms an image of the modulated red beam on a screen 59.

The remaining blue and green beams (from the original incoming white beam) pass through the red dichroic mirror 54a. The opposite face of the mirror 54a is attached to a prism face 52ca of the prism 52c, an arrangement that causes the blue and green beams to pass through the red dichroic mirror 54a, pass through the prism face 52ca of the prism 52c, travel through the prism 52c and pass through a prism face 52cb (of the prism 52c) that forms an acute angle with the prism face 52ca. The reflective face of a blue dichroic mirror 54b is mounted to the prism face 52cb or to the prism face 52da. As a result, the blue dichroic mirror 54b reflects the blue beam back into the prism 52c to cause the blue beam to exit another prism face 52cc of the prism 52c. The incident face of the display panel 60b is mounted to the face 52cc and modulates the incident blue beam. The modulated blue beam, in turn, follows a path similar to the path followed by the incident blue beam. The beam splitter 55 directs the modulated blue beam through the projection optics 57 to form an image of the modulated blue beam on the screen 59.

The green beam passes through the blue dichroic mirror 54b and enters the prism 52d through a prism face 52da that may be mounted to the other face of the blue dichroic mirror 54b via a transparent elastomeric adhesive layer 56b. The resiliency provided by the adhesive layer 56b, in turn, aids in positioning the display panel 60, as further described below. The green incident beam exits another prism face 52db of the prism 52d to strike the incident face of the display panel 60c that is mounted to the prism face 52db. The display panel 60 modulates the incident green beam before reflecting the modulated green beam along a path similar to the path followed by the incident green beam. The beam splitter 55 directs the modulated green beam through the projection optics 57 to form an image of the modulated green beam on the screen 59. The three modulated beam images form a color composite image on the screen 59.

For purposes of adjusting the position of one or more of the display panels 60, as further described below, the prisms 52b, 52c and 52d may be moved by the actuators 62 to reposition the display panels 60 that are attached to the prisms 52. In some embodiments, for this to occur, the prism 52a may be securely mounted to a chassis (not shown) of the light valve 404, and the other prisms 52b, 52c and 52d may move with respect to the prism 52a. More particularly, the actuator 62a may be mounted between and contact the prism faces 52ac and 52ba. In some embodiments, the actuator 62a may also be mounted near the edges of the prism faces 52cc and 52ba. Because the prism 52a may be secured to the chassis of the light valve 404 and because the adhesive layer 56a provides a resilient bond between the prisms 52a and 52b, the expansion or contraction of the actuator 62a causes the display panel 60a to rotate in the plane of the diagram. This rotation, in turn, causes the image to translate. In some embodiments, these motions, in turn, may be controlled to locally adjust the modulated red beam image on the screen 59 by adjusting the voltage that is applied to the piezoelectric actuator 62a, for example.

Other actuators 62 may be used to cause both translation and rotation of the other display panels 60 in a similar manner. For example, the actuator 62b may be positioned between and contacting the prism faces 52ab and 52ca. In this manner, expansion and contraction of the actuator 62b causes rotation and therefore image translation of the display panel 60b and thus, may be used to move both the modulated blue and green beam images.

Movement of the prism 52c by the actuator 62b may also cause movement of the prism 52d and thus, movement of the display panel 60c. However, the position of the display panel 60c may be adjusted by the actuator 62c that may be positioned between and contact the prism faces 52cb and 52da. In this manner, expansion or contraction of the actuator 62c may be used to adjust the position of the display panel 60c and thus, align the modulated blue beam image with the modulated red and green beam images.

Other arrangements are possible. For example, in other embodiments, actuators 62 (not shown) may be used to cause, for example, rotation of a particular display panel 60 about a plane that is orthogonal to the plane of the diagram.

The light valve 404 may include a parabolic mirror 65 to collimate rays of light from the light source 63. The light source 63 may be an arc lamp, for example. The light valve 404 may also include a condensing lens 61 to direct the white beam to the beam splitter 55. The beam splitter 55, in turn, may direct the white beam to a polarizer 49 that polarizes the white beam before the beam strikes the prism face 52aa.

The above-described solutions to alignment of the modulated beam images address both pixel translation and rotation. However, rotationally alignment of the modulated beam images may be accomplished in other ways as described below.

Figure 11:
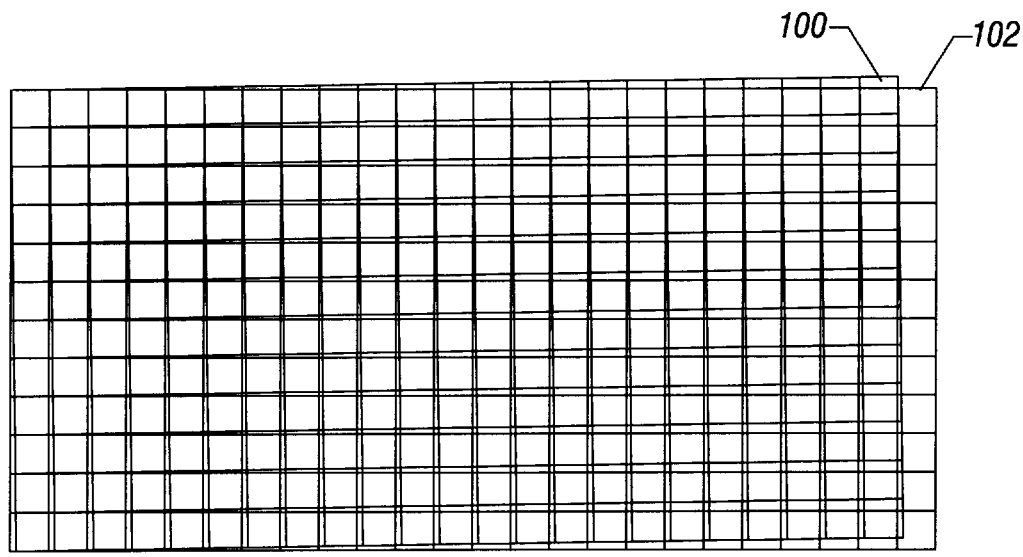

In general, the effects of rotational misalignment between two modulated beam images 100 and 102 may be very noticeable as depicted in FIG. 11. As shown, each of the beam images 100 and 102 may have dark lines in between adjacent pixel rows and pixel columns due to the nature of the display panel 60. Therefore, when the two beam images 100 and 102 are rotated relative to each other, certain parts of the composite image may be partially transparent because the dark lines nearly align with each other in these parts, and other parts of the composite image may be nearly opaque as the dark liner are close together in these parts. Although the beam images 100 and 102 are both translationally misaligned and rotationally misaligned by 1°, the rotational misalignment may be perceptually the most apparent.

There are several ways to rotationally align the modulated beam images. For example, the display panels 60 may be securely mounted to the faces of the prisms 52 a during assembly of the system 402. During the mounting, the convergence targets 425, for example, may be observed to physically position the display panels 60 correctly to cause beam convergence.

Figure 13:
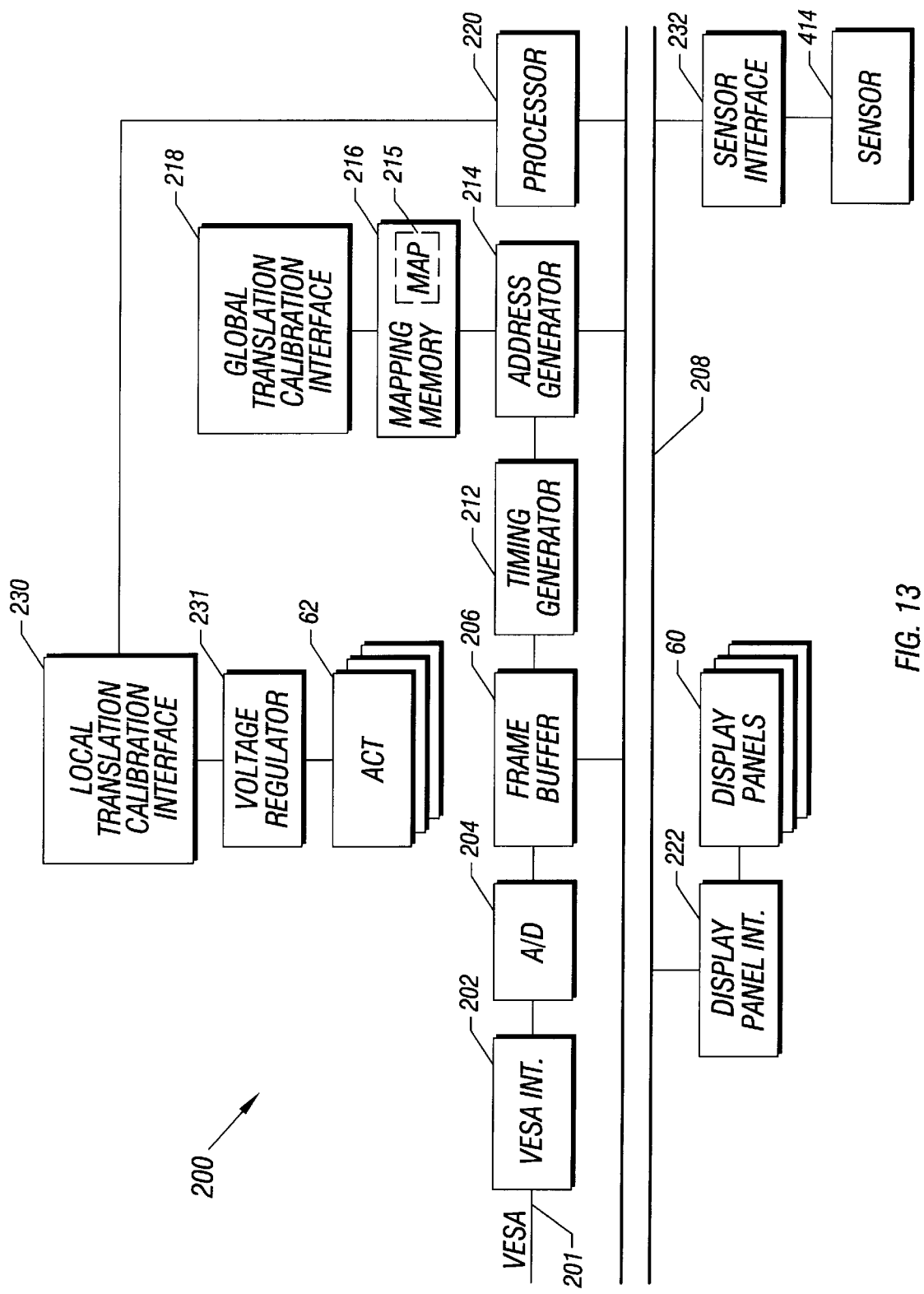
FIG. 13 is an electrical schematic diagram of the projection system of FIG. 4 according to an embodiment of the invention.

Referring to FIG. 13, the projection display 402 may include the electrical system 200 that may be part of a computer system, part of a stand-alone projector, part of a television, or part of a computer monitor as just a few examples. In particular, the electrical system 200 may include a Video Electronics Standards Association (VESA) interface 202 to receive analog signals from a VESA cable 201. The VESA standard is further described in the Computer Display Timing Specification, v.1, rev. 0.8 that is available on the Internet at www.vesa.orgstandards.html. The analog signals from the cable 201 indicate images to be formed on the display and may be generated by a graphics card of a computer, for example. The analog signals are converted into digital signals by an analog-to-digital (A/D) converter 204, and the digital signals are stored in a frame buffer 206. A timing generator 212 may be coupled to the frame buffer 206 and regulate a frame rate at which images are formed on the screen 59. A processor 220 (one or more microcontroller(s) or microprocessor(s), as examples) may be coupled to the frame buffer 206 via a bus 208.

The processor 220 may process the data stored in the frame buffer 206 to, as examples, transform the coordinate space used by the graphics card into the coordinate space used by the display panels 60, remap the color space used by the graphics card into the color space used by the display panels 60 and cause the data to conform to the gamma function of the display panels 60. The end product of these operations is a set of RGB values for each pixel of the image. In this manner, the R values are used to form the intensity values of the pixels of the red display panel 60a, the G values are used to form the intensity values of the pixels of the green display panel 60c and the B values are used to form the intensity values of the pixels of the blue display panel 60b.

Figure 14:
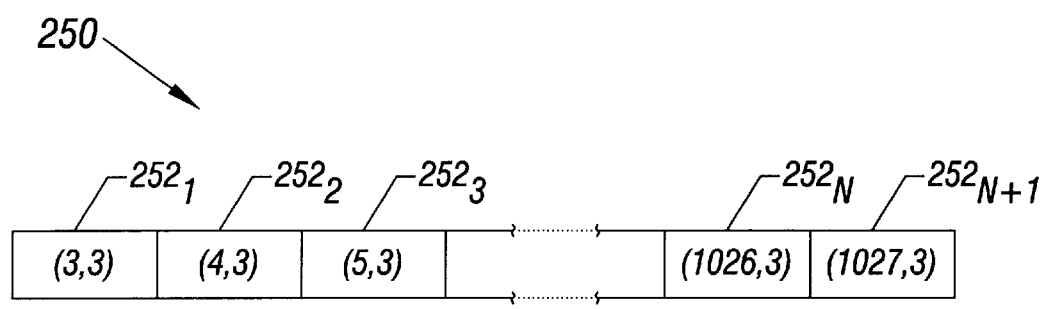
FIG. 14 is an illustration of a portion of a pixel map.

As described above, not all of the pixels of a particular display panel 60 may be used. Instead, a map 215 may be stored in a mapping memory 216 that indicates the desired mapping. The map 215, in turn, may be used by an address generator 214 that generates signals indicative of pixel addresses for pixels of the display panels 60. Referring to FIG. 14, as an example, for a particular display panel 60, N locations 252 (locations $252_1$, $252_2$, $252_3$, . . . $252_N$) of the map 215 may sequentially indicate the mapping for the uppermost row of a pixel image, beginning with the location (0,0) of the pixel image. As shown, location (0,0) of the pixel image maps into location (3,3) of the display panel 60, location (1,0) of the pixel image maps into location (4,3) of the display panel 60, location (1,1) of the pixel image maps into location (5,3) of the display panel 60, etc.

Referring back to FIG. 13, among the other features of the system 200, the system 200 may include a display panel interface 222 that is coupled to the bus 208 and drives the display panel voltages to form the images on the display panels 60. A global translation calibration interface 218 (an electromechanical user interface or a serial bus interface, as examples) may be electrically coupled to the address generator 214. In this manner, the calibration interface 218 may modify the map 215 in response to the global translation indicated by the controls (a computer or a control knob, as examples) that are coupled to the interface 218. A local translation interface 230 (an electromechanical user interface or a serial bus interface, as examples) may be, for example, coupled to a voltage regulator 231 to selectively control the voltages that are applied to the different piezoelectric actuators 62.

The sensor 414 may be coupled to the processor 220 through the bus 208 and the interface 232. Thus, the misalignment information detected by the sensor 414 may be analyzed by the processor 220 which then can provide appropriate commands for global or local translation calibrations, in one embodiment of the present invention.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system for measuring convergence alignment of a projected image of a projection display comprising:
a display screen that receives said projected image; an image capturing system to receive separate images of, at least two, spaced locations on said projected image on said display screen, said image capturing system being spaced from said display screen; and wherein said image capturing system includes an optical system to capture said separate images.

2. The system of claim 1 wherein said optical system includes a prism with a plurality of sides.

3. The system of claim 2 wherein said prism is pyramidally-shaped.

4. The system of claim 3 wherein said prism includes four sides.

5. The system of claim 1 wherein each of said separate images includes a convergence target.

6. The system of claim 1 including a housing and a screen in said housing having first and second sides, said projected image being projected on said first side of said screen for viewing on said second side of said screen.

7. The system of claim 6 wherein a portion of said projected image is viewable only on said first side of said screen.

8. The system of claim 7 wherein said optical system is on said first side of said screen.

9. The system of claim 8 wherein said spaced locations are only viewable on said first side.

10. A system for convergence alignment comprising:
a projection device to project an image; a screen to receive said image and to make a first portion of said image viewable by users of said system and to hide a second portion of said image from user view; and an image capturing system including an optical system, said optical system creates an enlarged image of at least two spaced apart regions of said second portion.

11. The system of claim 10 wherein said optical system includes a pyramidally-shaped prism.

12. The system of claim 11 wherein said prism includes four sides.

13. The system of claim 12 wherein said first portion of said image includes at least three corners and said prism is adapted to assist in capturing an image of said second portion adjacent said four corner regions.

14. The system of claim 10 including convergence targets located in said second portion.

15. The system of claim 10 wherein said optical system is adapted to enlarge the image of at least four spaced apart regions of said second portion.

16. The system of claim 10 including a housing, said screen supported for viewing of said image in said housing, said screen arranged to display said first and second portions inside of said housing and to display said first portion on the outside of said housing.

17. The system of claim 16 wherein said optical system is adapted to capture at least three spaced apart regions of said second portion.

18. The system of claim 17 wherein said optical system includes a pyramidally-shaped prism.

19. A method of measuring convergence alignment of a projection display comprising:

projecting a viewable image and a pair of convergence targets outside of said viewable image onto a display screen; creating separate images of said convergence targets; capturing an image of said separate target images using an optical system remote from said display screen; and analyzing said captured image to provide an indication of the convergence misalignment of said projected display.

20. The method of claim 19 further including enlarging the captured image.

21. The method of claim 19 further including occluding said targets from view by a user.

22. The method of claim 21 further including simultaneously capturing an image of at least three convergence targets, each located at the corner regions of said viewable image forming a composite image of said corner regions, and magnifying said composite image.

23. The method of claim 19 wherein capturing an image includes using a prism with at least two sides, each side aligned with a different one of said targets.

24. A system for measuring convergence misalignment comprising: an optical system to simultaneously capture a first combined image of four spaced apart regions of a second image formed by a projection display; and a device for analyzing said four regions to determine whether there is a convergence misalignment.

25. The system of claim 24 wherein said optical system includes a pyramidally-shaped prism arranged to refract an image of said four spaced apart regions.

26. The system of claim 25 wherein said optical system is adapted to enlarge the first image.

27. The system of claim 26 further including a projection screen and a housing, said screen contained inside said housing, said image capturing system also contained inside said housing such that said second image is displayed on said projection screen inside said housing and said second image is partially viewable from outside said housing on said screen, said screen arranged such that a portion of the second image on said projection screen inside said housing is not viewable from outside said housing.

* * * * *